United States Patent [19]

Breckenridge, Jr.

[11] 3,768,765

[45] Oct. 30, 1973

[54] THERMALLY ISOLATING STRUCTURAL SUPPORT SYSTEM AND CRYOGENIC ASSEMBLY EMBODYING THE SAME

[75] Inventor: Robert Warren Breckenridge, Jr., Harvard, Mass.

[73] Assignee: Arthur D. Little Inc., Cambridge, Mass.

[22] Filed: Feb. 14, 1972

[21] Appl. No.: 225,914

[52] U.S. Cl. ............... 248/146, 248/DIG. 1, 62/45
[51] Int. Cl. ............................................ F22b 37/24
[58] Field of Search ............... 248/DIG. 1, 55, 200, 248/309, 146, 15, 18, 20, 26, 358 R, 358 AA; 62/45; 188/1 B; 122/510

[56] References Cited
UNITED STATES PATENTS

| | | | |
|---|---|---|---|
| 712,688 | 11/1902 | Krank | 248/358 AA |
| 2,890,009 | 6/1959 | Chapellier | 248/DIG. 1 |
| 2,924,419 | 2/1960 | Wells | 248/358 AA |
| 3,129,836 | 4/1964 | Frevel | 248/146 |
| 3,250,508 | 5/1966 | Kfoury et al. | 248/358 R |

FOREIGN PATENTS OR APPLICATIONS

| | | | |
|---|---|---|---|
| 662,411 | 4/1963 | Canada | 62/45 |
| 419,944 | 4/1947 | Italy | 248/55 |

*Primary Examiner*—Marion Parsons, Jr.
*Attorney*—Bessie A. Lepper

[57] ABSTRACT

A thermally isolating structural support system to support a cryogenic refrigerator or cryogen tank and/or a refrigeration load within an insulated assembly in a manner to minimize heat transfer by conduction from the surroundings. The support system comprises a rigid support member, supporting pins affixed to the rigid member, and a bushing for each pin in which ball supports maintain a spacing between the pin and bushing and permit the pin to move freely parallel to its axis, but constrains its movement perpendicular to its axis. The support system may be used to support several loads within the same assembly.

9 Claims, 13 Drawing Figures

THERMALLY ISOLATING STRUCTURAL SUPPORT SYSTEM AND CRYOGENIC ASSEMBLY EMBODYING THE SAME

The invention herein described was made in the course of or under a contract with the united States Air Force.

This invention relates to a support system and more particularly to a thermally insulating support system suitable for supporting a load (including a cryogenic refrigerator, cryogen tank and/or a refrigeration load) in a manner to minimize heat leaks by conduction into the assembly into which the support system is incorporated.

It is sometimes necessary to provide refrigeration at cryogenic temperatures over an extended period of time and also, if desired, to use a stored cryogen to cool a refrigeration load, e.g., a superconducting magnet, within a closed system. The required cryogenic refrigeration may be provided by storing a liquid cryogen (e.g., liquid helium) in the closed system or by incorporating a cryogenic refrigerator or liquifier into the system. Such an arrangement requires that both the means for providing cryogenic refrigeration and the refrigeration load must be supported within a thermally insulated system. In some cryogenic applications it is also necessary to support a cryogen tank or refrigerator and its refrigeration load in a manner to enable these supported objects to survive shocks, vibrations and acceleration loads while providing high impedance to heat flow. Prior art apparatus for achieving this type of support has included the use of a multiplicity of slender tension members (e.g., stainless steel wires) either alone or combined with bumpers to limit deflections. In a number of cases, particularly if the mass of the supported object is high and the mechanical environment is severe, the heat leak for such a system may be prohibitively high.

Heat transfer from the atmosphere into such an insulated system is by radiation, convection and conduction. Heat transfer by radiation maybe minimized by the use of radiation shielding; and by convection by evacuating the volume around the components to be insulated. Since, however, there must be some support system to hold up these components (e.g., cryogen container and refrigeration load) there must always be heat conductive supporting elements which provide a heat transfer path between the ambient atmosphere and the interior of the support system by virtue of conducting areas in the support system. In order to minimize heat transfer by conduction it is necessary to minimize such conducting areas while at the same time providing for the relative large dimensional changes undergone by the supporting structure due to change in temperature. The thermally isolating structural support system of this invention achieves this dual requirement of minimizing heat transfer through conduction and of permitting dimensional changes brought about through changing temperatures.

It is therefore a primary object of this invention to provide an improved thermally isolating support system particularly useful for minimizing heat transfer by conduction. It is another object of this invention to provide a support system of the character described which is capable of functioning over a wide range of load conditions and of withstanding shocks, vibrations and accelerations. A further object of the invention is to provide a thermally isolating structural support system particularly suitable for supporting a means to provide cryogenic refrigeration and a refrigeration load in a closed, unattended assembly over an extended period of time. Other objects of the invention will in part be obvious and will in part be apparent hereinafter.

The invention accordingly comprises the features of construction, combinations of elements, and arrangement of parts which will be exemplified in the constructions hereinafter set forth, and the scope of the invention will be indicated in the claims.

The thermally isolating structural support system of this invention comprises a rigid member adapted to support a load, a plurality of supporting pin members affixed to the outer wall of the rigid member, a bushing associated with each pin member in which the pin member is free to move parallel to its axis but is restrained from moving perpendicular to its axis, and a bushing support adapted to maintain the bushings in fixed spaced relationship to the rigid member. Each of the pin members is mounted in its associated bushing through a plurality of spherical balls which maintain a spacing between the outer wall of the pin and the internal wall of the bushing. If the support assembly is to be subjected to rapidly varying load conditions (e.g., shocks, vibrations and accelerations), then the balls are preferably held in resilient seats. The support system of this invention is readily adaptable to supporting several loads independently within the same system.

For a fuller understanding of the nature and objects of the invention, reference should be had to the following detailed description taken in connection with the accompanying drawings in which FIG. 1 is a simplified cross sectional representation of one embodiment of the support assembly of this invention;

Figure 1:
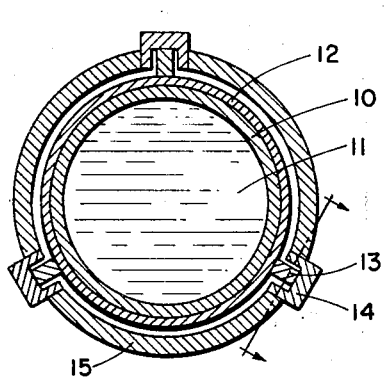

FIG. 1 illustrates in a somewhat simplified manner the support assembly of this invention. A load to be supported is represented by a generally cylindrical cryogen tank 10 which may contain a cryogen 11. The vessel 10 is held supported in a rigid support member 12 which has three radially extending pin members 13 affixed to its external wall and spaced in a plane around it. Each pin member 13 is mounted and held in a bushing 14 which in turn is mounted on a bushing support ring 15. Pin member 13 may move parallel to its axis in bushing 14 but not in a direction perpendicular to its axis. The rigid member 12 is constructed to have sufficient stiffness so that any deflections of pin members 13, even under maximum loadings, are only several thousandths of an inch. Rigid support member 12 serves to transmit the uniformly distributed load of the cryogen tank 10 from the tank to the three pin members 13 supported in their associated bushings.

Figure 2:
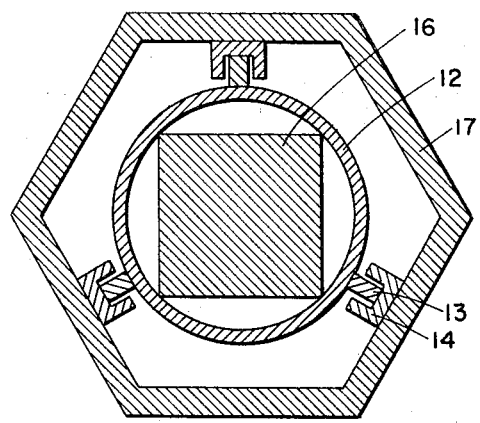
FIG. 2 is a simplified cross sectional representation of another embodiment of the support assembly of this invention.

As shown in FIG. 2, in which like components are referred to be like reference numerals in FIG. 1, the supported object or load 16 does not have to be a cylindrical tank but may be any object around which the rigid support member 12 is affixed. Likewise, the bushing support means 17 may assume any desired configuration so long as it provides the necessary support for the bushing 14.

For the sake of conciseness, it is assumed in the following detailed description that the means for providing cryogenic refrigeration is a cryogen-containing tank. However, it is within the scope of this invention to substitute a cryogenic refrigerator or liquifier (generally referred to herein as a cryogenic refrigerator) for the cryogen tank and its contained liquid cryogen as the source of refrigeration.

The rigid support member is illustrated as a ring in FIGS. 1 and 2. However, this component does not necessarily need to be of an annular or ring configuration so long as it is rigid. Likewise, it should be pointed out that although three pin members are illustrated throughout and it is generally preferable to have that number, a plurality, e.g., two or more, pin members may be used. It is also preferable, but not always necessary that the pin members be essentially equally spaced around the rigid member.

Figure 3:
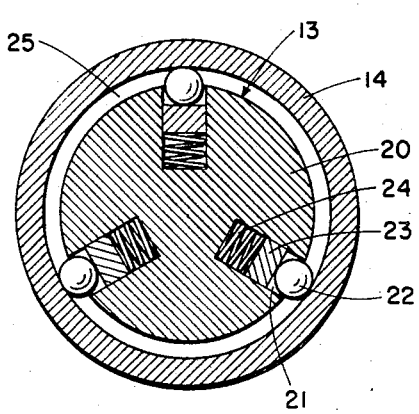
FIG. 3 is a cross section of one embodiment of the pin member and its associated bushing showing one form of resilient ball seat.

FIG. 3 is a simplified cross sectional representation of a single pin member and its associated bushing. In the embodiment of FIG. 3, the pin member 20 has three radial sockets 21 each of which houses a supporting spherical ball 22 (hereinafter referred to as a supporting ball) which rests on resilient seat means, formed in the embodiment of FIG. 3 of a ball seat 23 and spring 24. Thus the supporting ball in this embodiment is spring loaded. The pin 20 and the internal wall of bushing 14 are sized to define a narrow annular spacing 25 between them. In the embodiments illustrated in the drawings, three supporting balls are shown to be associated with and equally spaced around each pin member. This is a preferred arrangement; but it is within the scope of this invention to use one or more balls and to space them unequally around the pin member.

The supporting balls are formed of a material which has low thermal conductivity at cryogenic temperatures as well as adequate strength to carry the loads imposed on them. Such materials include, but are not limited to stainless steel and Pyrex glass. Pyrex glass spheres have been disclosed as support elements for cryogenic equipment. (See for example "Heat Conduction Through Insulating Supports in Very Low Temperature Equipment." R.P. Miksell and R.B. Scott, Journal of Research of the National Bureau of Standards, 57:371 (Dec. 1956) and U.S. Pat. No. 3,274,788.)

Figure 4:
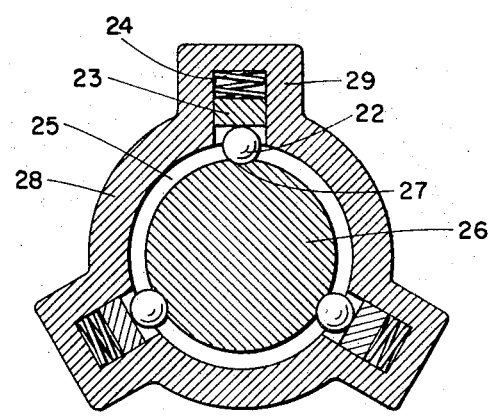
FIG. 4 is a cross section of another embodiment of the pin member and its associated bushing using the resilient ball seat of FIG. 3.

Although it will generally be more desirable, especially from a construction point of view, to locate the ball seats within pin 20, it is also possible to locate them in the bushing housing as shown in FIG. 4. In the embodiment of FIG. 4, the pin 26 has three shallow grooves 27 for locating balls 22; and the bushing wall 28 is configured to provide outwardly extending radial extensions 29 to accommodate the ball seats 23 and springs 24.

Figure 5:
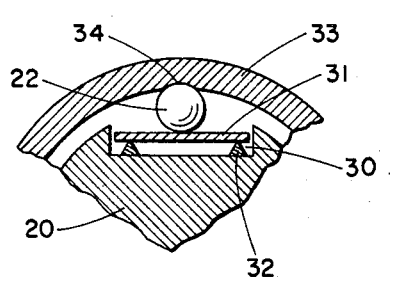
FIG. 5 is a fragmentary cross section illustrating another form of resilient ball seat.

FIG. 5 illustrates a modification in the resilient ball seats of FIGS. 3 and 4. The radial socket 30 is adapted to contain a leaf spring 31 and its supporting means 32; and the internal surface of bushing wall 33 is slightly grooved at 34 to provide a shallow locating groove for ball 22.

Where loading conditions are less severe and shocks, vibrations or accelerations (or a combination of these conditions) are not to be encountered, then the ball seat need not be resilient. This is illustrated in the fragmentary cross section of FIG. 6. In this modification the spring is omitted and ball 22 rests only on seat 23.

All of the components of the support system of this invention are rigid so that the innermost member (rigid support member) is supported on the pins from the outermost component (bushing housing) regardless of the direction of the force on the innermost member. In addition, the force on any pin is in the transverse direction only and there is no axial component of force. Thus the various components of the support system are supported from one another; yet they are permitted to expand and contract parallel to the pin axes as the temperature changes without stressing the support system.

Figure 6:
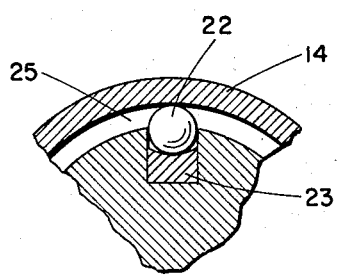
FIG. 6 is a fragmentary cross section illustrating a nonresilient ball seat.

In the embodiments of FIGS. 3-5 where the support balls are spring loaded, any transverse load on the pins is transmitted through the spring and ball to the bushing, provided the force is not great enough to cause the pin to contact the internal wall of the bushing. Therefore, at low loads the forces are transmitted through the balls alone. But at high loads (e.g., during severe vibration or acceleration) the forces are carried around the balls through the contact point between the deflected pin and the bushing. Under such high loads the thermal resistance of the expanded contacting areas is lowered; but since such high loads are generally of short duration the temporary, relatively high conductance of the system can be tolerated. The advantage of the ball seating arrangement of FIGS. 3-5 over that of FIG. 6 is that the force transmitted by the ball is limited by the spring and clearance to a known value, regardless of the load, and hence breakage of the balls (if formed of glass) and mechanical failure of the support system may be avoided.

Figure 7:
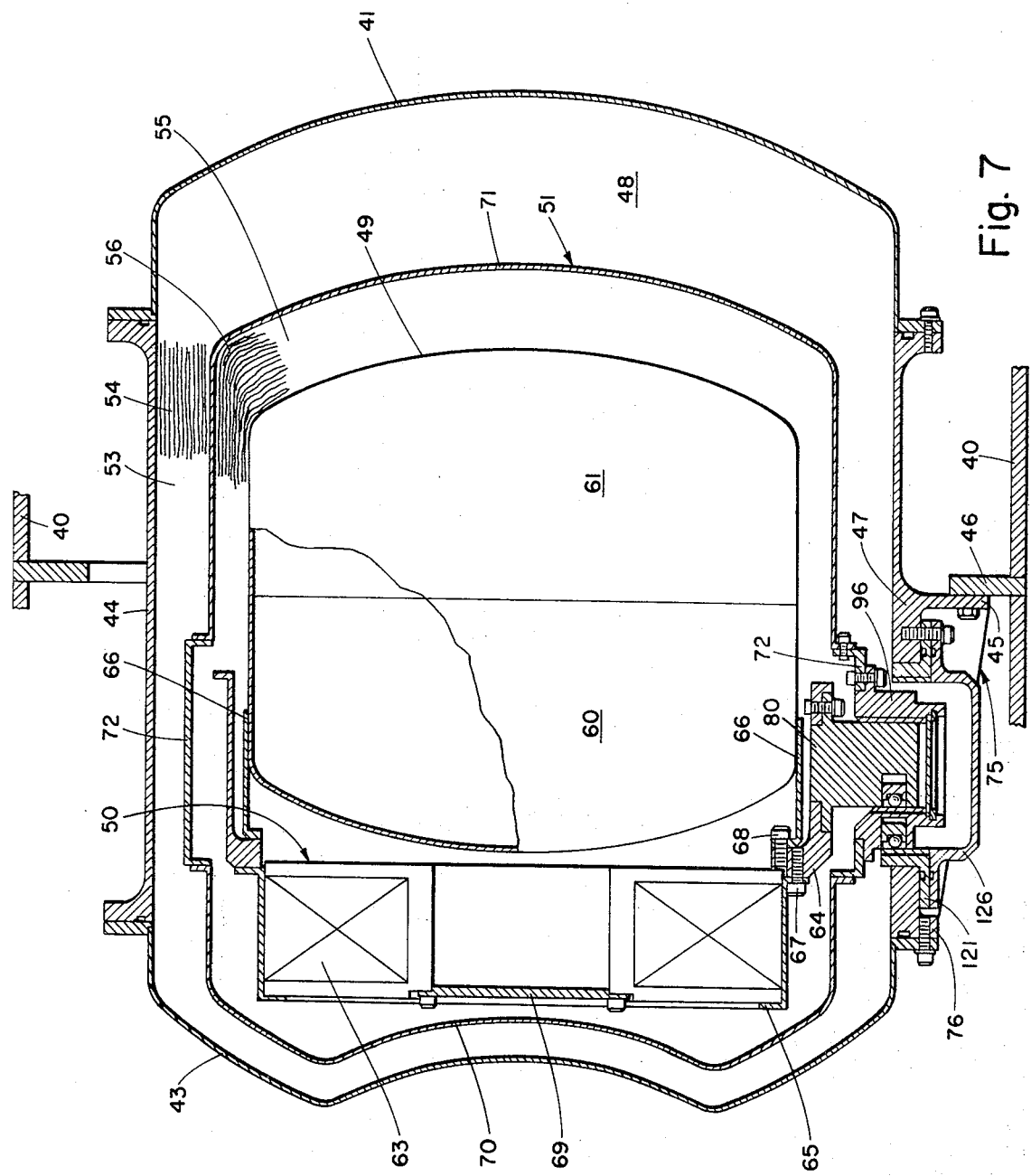
FIG. 7 is a cross section of a system incorporating multiple support assemblies of this invention to support separately a cryogen container and a refrigeration load.

FIG. 7 is a longitudinal cross section of a dewar assembly incorporating dual support systems constructed in accordance with this invention. Reference should also be had to FIGS. 8-13 which illustrate certain component parts in enlarged detail. The assembly of FIG. 7 is designed to contain a cryogen tank and a refrigeration load along with radiation shielding. The cryogen tank and refrigeration load are supported on a first inner thermally isolated support system of this invention and the radiation shielding on a second outer support system. The rigid support members, in the form of rings, and the pins of the inner and outer systems are concentric; and the supporting balls are aligned radially in the same plane.

Before describing the dual concentric thermally isolating support systems of the apparatus of FIG. 7 it will be helpful to describe the components of the assembly to be supported. In the apparatus of FIG. 7, the dewar assembly may have any suitable external support structure shown fragmentarily at 40. A vacuum shell, formed of first end cover 41, a second end cover 43 and a central section 44 serves as the external housing of the assembly. This vacuum shell may be affixed to external support structure 40 through a plurality of rigid skirt members 45 which are bolted to a support ring 46 mounted in external support structure 40. It will be appreciated by those skilled in the art that there are many ways in which the vacuum shell may be supported and that the embodiment illustrated in FIG. 7 is merely exemplary of one of these ways. The rigid skirt members 45 are integral flanged extensions of a thickened section 47 of central shell section 44. The vacuum shell sections are flanged and joined through O-ring seals to define a fluid-tight chamber 48 in which a cryogen tank 49, refrigeration load 50 and radiation shielding 51 are located. Evacuation lines, cryogen fill and vent lines, valves, controls and vacuum pumps are not illustrated inasmuch as the placement and use of these is well known in the art.

The cryogen tank 49 is formed of two torispherical heads 60 and 61. The refrigeration load 50 is illustrated to be a superconducting magnet 63 supported by magnet support ring 64 which in turn is bolted to a flanged magnet mating ring 65 and a cryogen tank skirt 66 which holds the cryogen tank 49. The tank wall, tank skirt 66, support ring 64 and mating ring 65, which are bolted by cap screws 67 and 68, preferably through indium shims, provide a thermal connection between the liquid cryogen within the tank and the superconducting magnet. The magnet is equipped with a cover 69.

The radiation shielding 51 is formed of two end caps 70 and 71 joined by a central stiff, channel-shaped ring 72 which serves to transmit the uniformly distributed loads of the radiation shielding to the three support points of the radiation shielding support system.

The evacuated space 53 between the vacuum shell and the radiation shielding contains suitable insulation 54 such as that known as multilayer insulation; and the evacuated space 55 between the radiation shielding and cryogen tank (or cold end of a refrigerator if used in place of the cryogen in the tank to provide refrigeration) likewise contains a suitable insulation 56. It is, of course, known in the art to cool the radiation shielding if desired, such as by circulating a coolant, e.g., liquid nitrogen in coils thermally linked to the shielding.

The vacuum housing has three rigid support points, one of which is shown at 75. These support points are formed as extensions of a ring 76, which is in turn integral with section 47 of the vacuum shell; and they serve, as noted above, as the means to support the vacuum shell through ring 46.

Figure 13:
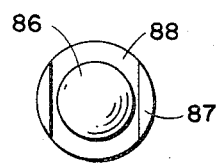
FIGS. 11 and 12 are enlarged cross sectional views and FIG. 13 is a top planar view of the ball seats used in the apparatus of FIG. 7.

One of each of the inner pin members of the thermally isolated support system of FIG. 7 is illustrated in detailed cross sectional views in FIGS. 8–12 and in the top planar view of FIG. 13, wherein like reference numerals are used to identify like components in FIG. 7. Magnet support ring 64, to which the cryogen tank and the superconducting magnet are attached through tank skirt 66 and magnet mating ring 65, serves as the inner rigid support member for the cryogen tank and the refrigeration load. Three supporting inner pin members 80 (only one being shown) are attached through flanges 81 to support ring 64 through a plurality of cap screws 82 equally spaced around flange 81.

Figure 10:
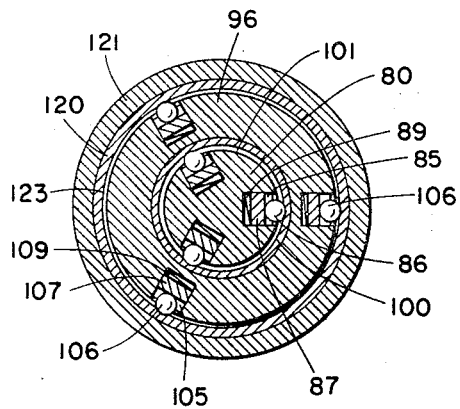
FIG. 10 is a detailed cross section of the multiple support assemblies of FIG. 8 taken through plane 10—10 of FIG. 8.
Figure 11:
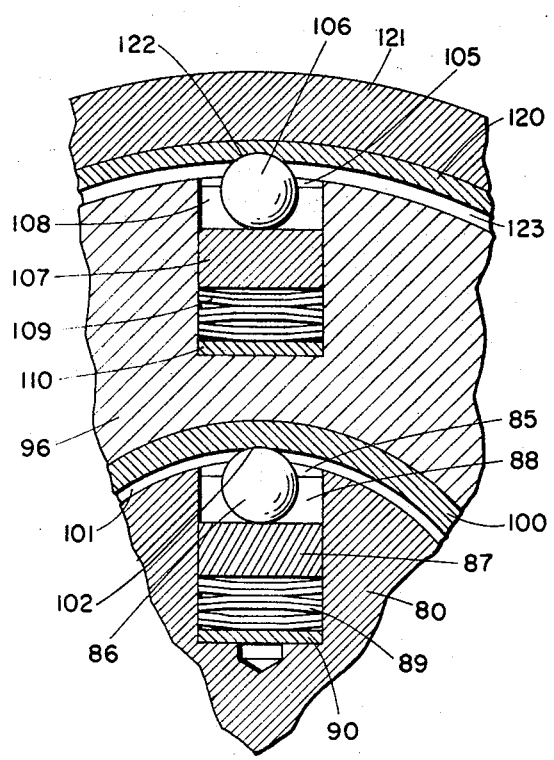
Figure 12:
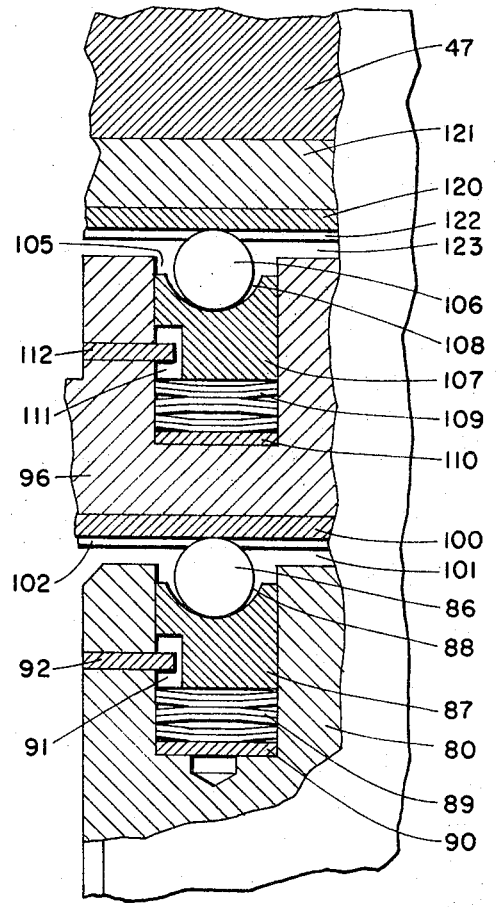

As will be seen in the cross sectional views of FIGS. 10–12, inner pin 80 has three radial sockets 85 in which the locating and seating means for the inner supporting balls 86 are seated. Each of the seating means comprises a metal seat member 87 with a ball locating channel 88, a Belleville washer 89 providing a resilient support for seat 87, and a steel spacer 90. Each metal seat member 87 has a keyway 91 adapted to be engaged by a small pin 92 which is inserted through a hold drilled in the end of inner pin 80. The purpose of pin 92 is to permit seat member 87 from rotating.

Figure 8:
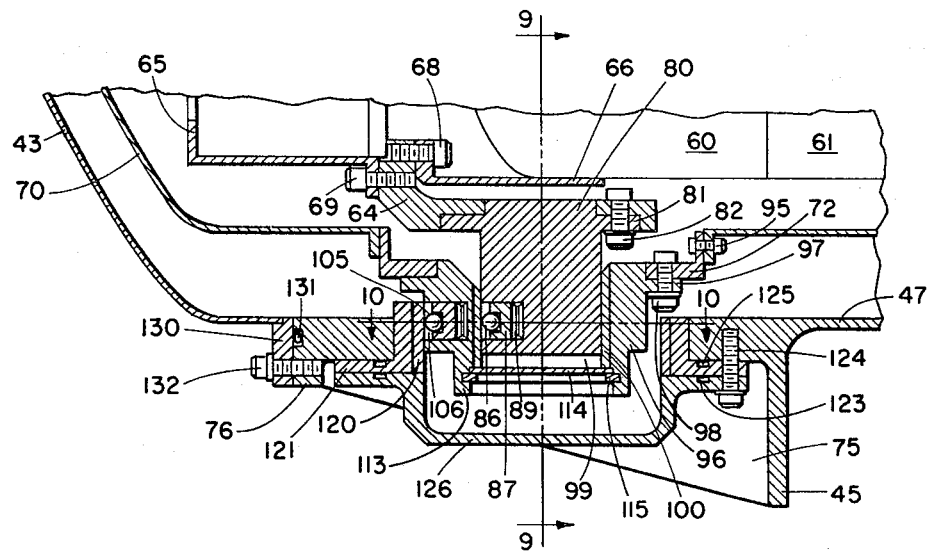
FIG. 8 is a detailed cross section of the multiple support assemblies of FIG. 7.
Figure 9:
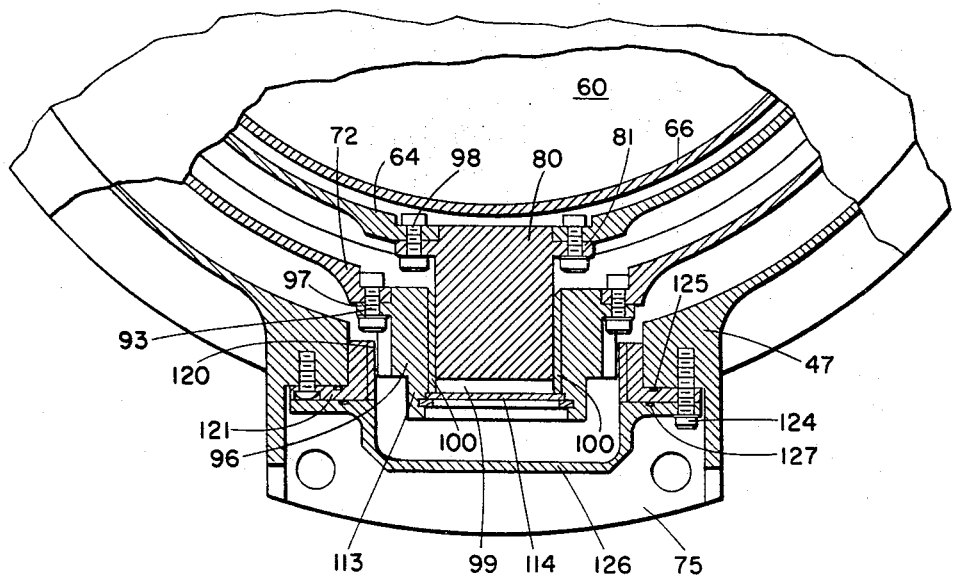
FIG. 9 is a detailed cross section of the multiple support assemblies of FIG. 8 taken through plane 9—9 of FIG. 8.

As will be seen in the cross sectional views of FIGS. 8–10, the second outer thermally isolating support of the dual system illustrated supports the radiation shielding. The stiff, channel shaped central ring 72, which is joined to end caps 70 and 71 of the radiation shield through a plurality of cap screws such as 95, serves as the rigid support member for the outer support structure formed in accordance with this invention. The outer pin 96 of the outer support has an integral attachment flange 97 through which it is attached to the stiff central ring 72 by means of a plurality of cap screws 93.

The outer pin 96 has a central channel 99, the internal wall of which is lined with a stainless steel liner 100 which serves as the bushing for inner pin 80 and its associated supporting balls 86. As will be seen in FIGS. 11 and 12, the supporting balls 86 maintain an annular spacing 101 between the wall of pin 80 and the internal wall of bushing 100. This internal bushing wall 100 has radial bushing grooves 102 adapted to engage a small surface area of balls 86. It will be seen from FIGS. 11–13 that by having the axis of bushing groove 102 perpendicular to the axis of channel 88 in ball seat 87, the ball will be held at the point where groove 102 and channel 88 cross, making it possible to position the balls while preventing them from being dislocated during use, even if they move back and forth in their grooves. The annular wall of outer pin 96 serves, in this embodiment, as the support means for inner bushing 100.

Outer pin 96 has three radial sockets 105 in which the locating and seating means for the outer supporting balls 106 are seated. As in the case of inner support system, each of these seating means for the outer supporting pins comprises a metal seat member 107 with a ball locating channel 108, a Belleville washer 109 providing a resilient support for seat 107, and a steel spacer 110. Each metal seat member 109 also has a keway 111 adapted to be engaged by a small pin 112 which is drilled in a hole in outer pin 96. As seen in FIG. 8, outer pin 96 has a thinner wall section 113 outboard of radial sockets 105, the internal wall of this section being configured to retain an inner support cover 114 by means of snap ring 115.

The outer bushing 120 is, like inner bushing 100, a stainless steel liner in a flanged bushing support 121, and like bushing 100, it is radially grooved at 122 to provide a similar locating and holding point for supporting balls 106 which maintain annular spacing 123 between outer pin 96 and bushing 120. Bushing support 121 is affixed to thickened section 47 of the central section 44 of the vacuum shell through cap screws such as 124 and O-ring seal 125. An outer support cover 126 is vacuum tightly sealed over the dual support system to bushing support 113 through an O-ring seal 127 using cap screws 124. Finally, the end cover 43 of the vacuum shell is vacuum-tightly sealed to the central section 44 through a ring 130, O-ring seal 131 and cap screws 132.

In a multiple support system such as that shown in FIGS. 7–13, it is preferable to align the supporting balls radially from support system to support system as is done in the embodiment illustrated. Such radial alignment contributes some rigidity to the systems. It is, of course, within the scope of this invention to combine any number of support systems into a multiple system in a manner similar to that shown in FIGS. 7–13.

It will be seen tht under normal loading conditions the only physical contact between the supported load and the supporting structure (e.g., the vacuum shell of FIG. 7) are the small contacting areas of the supporting balls. By constructing these balls from a material which has a relatively low thermal conductivity, heat transfer by conduction from the atmosphere to the supported load is minimized. This minimization of conductive heat transfer is achieved without sacrificing the structural strength of the system.

It will thus be seen that the objects set forth above, among those made from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:

1. A thermally isolating structural support assembly, comprising in combination
   a. a rigid support member adapted to be affixed to a load to be supported;
   b. a plurality of supporting pin members affixed to said rigid support member and extending radially outward therefrom;
   c. bushing means associated with each of said pin members, the external walls of said pin members defining radial spacings with the internal walls of said bushing means;
   d. a plurality of supporting spherical balls seated in a plane normal to the axis of each of said pin members between each of said pin members and its associated bushing means to maintain said radial spacings, whereby said pin members are permitted free movement parallel to their axes but are constrained from movement perpendicular to their axes; and
   e. bushing support means adapted to maintain said bushing means in a fixed spaced relationship with respect to said ring support member.

2. A structural support assembly in accordance with claim 1 wherein said rigid support member is of a ring configuration.

3. A structural support assembly in accordance with claim 1 characterized by having three supporting pin members affixed at equally spaced intervals to said rigid support member.

4. A structural support assembly in accordance with claim 1 wherein each pin member has three supporting spherical balls associated therewith, said balls being equally spaced around said pin member.

5. A structural support assembly in accordance with claim 1 wherein said balls are held in resilient seats.

6. A structural support assembly in accordance with claim 5 wherein said resilient seats are located in radial sockets in said pin members.

7. A structural support assembly in accordance with claim 5 wherein said resilient seats are located in said bushing.

8. A structural support assembly in accordance with claim 5 wherein said bushing means have shallow radial groovings adapted for engagement with said balls and said resilient seats have channels, the axes of which are transverse to said radial groovings whereby said balls are retained at the point defined by the intersections of said groovings and said channels.

9. A structural support assembly in accordance with claim 8 wherein said resilient seats have surface keyways and pins engageably with said keyways thereby to maintain said channels transverse to said groovings.

* * * * *